(12) United States Patent
Holbrook et al.

(10) Patent No.: US 7,014,543 B1
(45) Date of Patent: Mar. 21, 2006

(54) OPTICAL DISC RESURFACING AND BUFFING APPARATUS

(75) Inventors: Paul R. Holbrook, Buffalo Grove, IL (US); Tony J. Abfall, Mount Prospect, IL (US); Sigurd A. Nelson, II, Evanston, IL (US); David R. Low, New Lenox, IL (US)

(73) Assignee: Digital Innovations, LLC, Arlington Heights, IL (US)

( * ) Notice: Subject to any disclaimer, the term of this patent is extended or adjusted under 35 U.S.C. 154(b) by 0 days.

(21) Appl. No.: 11/008,682

(22) Filed: Dec. 9, 2004

Related U.S. Application Data

(60) Provisional application No. 60/528,268, filed on Dec. 9, 2003.

(51) Int. Cl.
*B24B 7/00* (2006.01)
(52) U.S. Cl. .......................... 451/66; 451/57; 451/393
(58) Field of Classification Search ................. 451/66, 451/65, 63, 59, 57, 178, 392, 393, 246, 254
See application file for complete search history.

(56) References Cited

U.S. PATENT DOCUMENTS

| | | | |
|---|---|---|---|
| 1,335,352 A | 3/1920 | Slowey |
| 1,343,156 A | 6/1920 | Prinz |
| 1,507,836 A | 9/1924 | King |
| 2,266,875 A | 12/1941 | Le Bel |
| 2,406,385 A | 8/1946 | Kistler |
| 2,907,146 A | 10/1959 | Dyar |
| 3,005,223 A | 10/1961 | Taylor |
| 3,048,482 A | 8/1962 | Hurst |
| 3,098,329 A | 7/1963 | Doran |
| 3,297,599 A | 1/1967 | Eschen |
| 3,307,969 A | 3/1967 | Quinn |
| 3,455,866 A | 7/1969 | D'Alessandro |
| 3,468,079 A | 9/1969 | Kaufman |
| 3,808,753 A | 5/1974 | Maran |
| 3,915,671 A | 10/1975 | Kagawa |
| 3,959,194 A | 5/1976 | Adelmann |
| 4,078,340 A | 3/1978 | Klecker et al. |
| 4,088,729 A | 5/1978 | Sherman |
| 4,101,999 A | 7/1978 | Doyel |
| 4,106,915 A | 8/1978 | Kagawa et al. |
| 4,107,810 A | 8/1978 | Varni et al. |
| 4,111,666 A | 9/1978 | Kalbow |
| 4,149,294 A | 4/1979 | MacKay, Jr. et al. |

(Continued)

FOREIGN PATENT DOCUMENTS

JP        54-100701        8/1979

(Continued)

OTHER PUBLICATIONS

Chartrand, S. "Removing Scratches on Compact Discs" *New York Times*, Jun. 5, 1995, p. D2.

*Primary Examiner*—Dung Van Nguyen
(74) *Attorney, Agent, or Firm*—Michael Best & Friedrich LLP

(57) ABSTRACT

An apparatus for resurfacing and buffing the playable surface of an optical disc is provided. The apparatus includes a reciprocally mounted disc support having a rotatably mounted platen or turntable on which a disc may be received, a resurfacing wheel, a buffing wheel, and a power-driven and timed drive assembly for driving the disc support member between a loading/unloading station, a resurfacing station for engagement with the resurfacing wheel, and a buffing station for engagement with a buffing wheel.

7 Claims, 1 Drawing Sheet

U.S. PATENT DOCUMENTS

| | | |
|---|---|---|
| 4,160,761 A | 7/1979 | Prusinski et al. |
| 4,179,852 A | 12/1979 | Barnett |
| 4,202,071 A | 5/1980 | Scharpf |
| 4,240,483 A | 12/1980 | Gregoric |
| 4,251,576 A | 2/1981 | Osborn et al. |
| 4,365,448 A | 12/1982 | Wilson |
| 4,368,756 A | 1/1983 | Carlson |
| 4,451,836 A | 5/1984 | Leonard et al. |
| 4,462,036 A | 7/1984 | Leonard et al. |
| 4,476,601 A | 10/1984 | Oka |
| 4,504,999 A | 3/1985 | Pedrotte |
| 4,520,470 A | 5/1985 | d'Alayer de Costemore d'Arc |
| 4,554,765 A | 11/1985 | Grimes et al. |
| 4,556,433 A | 12/1985 | Clausen |
| 4,561,142 A | 12/1985 | Mischenko et al. |
| 4,604,672 A | 8/1986 | Davis et al. |
| 4,617,767 A | 10/1986 | Ali |
| 4,653,236 A | 3/1987 | Grimes et al. |
| 4,654,917 A | 4/1987 | Yeung |
| 4,662,025 A | 5/1987 | Fritsch |
| 4,675,975 A | 6/1987 | Kucharczyk et al. |
| 4,709,437 A | 12/1987 | Hehn et al. |
| 4,713,856 A | 12/1987 | Clausen |
| 4,750,231 A | 6/1988 | Kogashiwa |
| 4,750,915 A | 6/1988 | Tomita et al. |
| 4,754,580 A | 7/1988 | Mattson |
| 4,783,870 A | 11/1988 | Yeung |
| 4,825,497 A | 5/1989 | Nagao et al. |
| 4,854,001 A | 8/1989 | Mannheimer et al. |
| 4,860,611 A | 8/1989 | Flanagan et al. |
| 4,918,116 A | 4/1990 | Gardziella et al. |
| 4,945,687 A | 8/1990 | Scheider et al. |
| 5,090,078 A | 2/1992 | Kamakura et al. |
| 5,099,618 A | 3/1992 | Schmid |
| 5,101,602 A | 4/1992 | Hashimoto |
| 5,146,382 A | 9/1992 | Yao-Ko |
| 5,174,795 A | 12/1992 | Wiand |
| 5,209,760 A | 5/1993 | Wiand |
| 5,228,022 A | 7/1993 | Compton et al. |
| 5,232,470 A | 8/1993 | Wiand |
| 5,250,085 A | 10/1993 | Mevissen |
| 5,281,244 A | 1/1994 | Wiand |
| 5,292,567 A | 3/1994 | Foster |
| 5,297,366 A | 3/1994 | Huddleston |
| 5,423,103 A | 6/1995 | Born |
| 5,449,388 A | 9/1995 | Wiand |
| 5,593,343 A | 1/1997 | Bauer |
| 5,607,488 A | 3/1997 | Wiand |
| 5,733,179 A | 3/1998 | Bauer |
| 5,954,566 A * | 9/1999 | Bauer .......................... 451/41 |
| 5,964,650 A * | 10/1999 | Born et al. .................... 451/63 |
| 6,322,430 B1 * | 11/2001 | Kennedy et al. ............. 451/287 |
| 6,595,835 B1 * | 7/2003 | Gadbois ....................... 451/66 |
| 6,609,959 B1 * | 8/2003 | Takahashi et al. ............. 451/65 |
| 6,726,527 B1 * | 4/2004 | Lalli et al. ..................... 451/5 |
| 6,780,090 B1 | 8/2004 | Kennedy et al. |
| 2002/0129455 A1 | 9/2002 | Wei |

FOREIGN PATENT DOCUMENTS

| | | |
|---|---|---|
| JP | 57-3206 | 1/1982 |
| JP | 4 372785 | 12/1992 |
| JP | 5 12832 | 1/1993 |
| JP | 5 159528 | 6/1993 |
| JP | 5 303871 | 11/1993 |

* cited by examiner

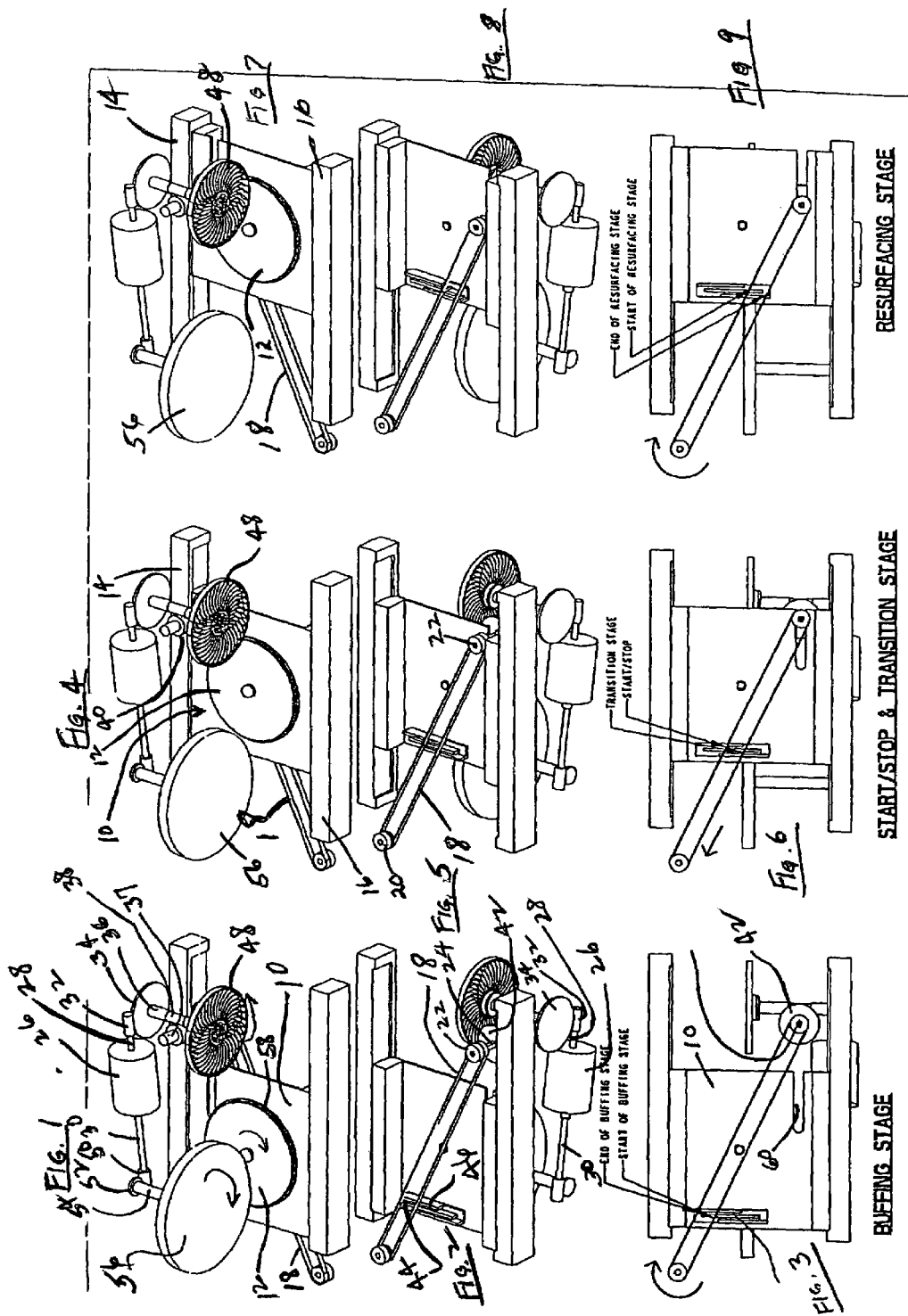

OPTICAL DISC RESURFACING AND BUFFING APPARATUS

CROSS-REFERENCE TO RELATED PATENT APPLICATIONS

This patent application claims the benefit of U.S. Provisional Patent Application No. 60/528,268, filed Dec. 9, 2003.

FIELD OF THE INVENTION

This invention relates in general to an apparatus for repairing an optical disc, and more particularly to an automated apparatus for resurfacing and buffing an optical disc.

BACKGROUND OF THE INVENTION

Heretofore, it has been well known to provide devices capable of cleaning and repairing the readable surface of an optical disc for eliminating optical reader distortion (e.g., reflection and/or refraction) that interferes with proper reading of the data encoded on an optical disc. Such distortions may be caused by scratches or other surface imperfections as well as foreign material such as dust, smudges, oil, grease, dirt, hairs, fingerprints, or other matter that may adhere to the readable surface of an optical disc. It is well known that distortion of the optical reading characteristics of a disc interferes with the reading of the disc. U.S. Pat. Nos. 5,423,103 and 5,964,650, commonly assigned to the assignee herein, disclose an apparatus for resurfacing and/or buffing the readable surface of an optical disc. The manually driven apparatus disclosed in the above U.S. Pat. No. 5,423,103 may not provide consistent results in resurfacing and buffing of an optical disc due to its manually driven operation. While the apparatus shown in U.S. Pat. No. 5,964,650 is primarily directed to the configuration of a resurfacing wheel, it also teaches the manual buffing of a disc. Such manual buffing requires a fair amount of force in order to be effective and it becomes tedious and tiring to the user especially if a plurality of discs is to be repaired at one time. Moreover, the amount of time to effectively buff a disc must be estimated. In view of the foregoing a combination buffing and resurfacing apparatus is desirable.

BRIEF SUMMARY OF THE INVENTION

The subject apparatus includes a sliding table or support that is reciprocally mounted between opposed guides and on which is rotatably mounted a platen or turntable for receiving an optical disc. Suitably mounted above the table are a resurfacing wheel rotatable on a horizontal axis, and a buffing wheel rotatable on a horizontal axis to properly perform resurfacing and buffing operations as the table with a disc on the platen is selectively positioned below each of the wheels. A single motor operates a drive assembly for not only rotatably driving the wheels but also for driving the sliding table from a loading/unloading position to resurfacing and buffing positions beneath the resurfacing wheel and the buffing wheel. A timing chain or belt is operated by the motor in order to drive the table to perform the resurfacing and buffing operations on the disc for selected time intervals. Also, when the table is in the resurfacing wheel position, a driven gear engages a gear on the platen to drive the platen during the driving of the resurfacing wheel. In the buffing position, the buffing wheel itself causes rotation of the optical disc and platen in order to fully cover the playable surface of the disc.

While the surface of the disc may be wetted by spraying water thereon manually, a pump may also be provided which is automatically operated to spray water onto the surface of the disc when the table and the disc are in the resurfacing position. A cam operated drive operates the pump to start and stop the spraying of the water when the disc is in the resurfacing position.

Accordingly, the apparatus is capable of repairing a larger number of discs more effectively, more quickly and easily than any heretofore known resurfacing and/or buffing devices. It will be appreciated that any suitable fabric layers may be provided for the buffing wheel, and further that at least one layer could be of conductive cloth, while the other layers may be of anti-static cloth. Further, a conductive brush may be provided for wiping the disc after it contacts the buffing wheel in order to ground out any static electricity. Moreover, it should be appreciated that the times of the resurfacing of a disc and buffing may be varied, and which also could be adjusted to operate in conjunction with a clutching device for automatically operating the apparatus. Additionally, it should be appreciated that the buffing and/or resurfacing speeds of the wheels may be adjusted if desired, and that an emergency cutoff switch may be provided for emergency purposes. Preferably, the buffing wheel is of anti-fraying construction to enhance its life.

One can appreciate that a new and improved apparatus for resurfacing and/or buffing an optical disc in a more efficient and easy manner is provided. Further, the apparatus provides an automated process for the resurfacing and buffing functions in order to properly repair an optical disc for acceptable use.

BRIEF DESCRIPTION OF THE DRAWINGS

FIGS. 1 and 2 are top and bottom perspective views, respectively, of the subject apparatus for resurfacing and buffing an optical disc and illustrating the position of the disc table in the buffing position;

FIG. 3 is a bottom plan view of the subject apparatus with the disc table in the buffing position;

FIGS. 4 and 5 are top and bottom perspective views, respectively, of the subject apparatus and showing the disc table in the loading and unloading position;

FIG. 6 is a bottom plan view of the subject apparatus with the disc table in the loading and unloading position;

FIGS. 7 and 8 are top and bottom perspective views of the subject apparatus with the disc table in the resurfacing position; and FIG. 9 is a bottom plan view of the subject apparatus with the disc table in the resurfacing position.

DETAILED DESCRIPTION OF THE EMBODIMENTS

The subject apparatus provides an automated process of resurfacing and buffing an optical disc such as a laser disc, CD, DVD or the like to repair the disc and make it acceptable for continued use. The apparatus includes a disc supporting table automatically movable between loading/unloading, resurfacing and buffing stations. Further, the apparatus is driven by a common power source that drivingly rotates the resurfacing and buffing wheels and moves the optical disc table that supports a platen on which an optical disc is received between the resurfacing and buffing stations.

Referring now to the drawings, and particularly to FIGS. 4, 5 and 6, an optical disc table, generally indicated by the numeral 10, includes a platen or turntable 12 rotatably mounted thereon and on which is receivable a disc in the usual manner. The table is reciprocally mounted and guided between parallel opposed tracks 14 and 16.

The optical disc table 10 is driven along the tracks by a continuously driven timing belt or chain 18 trained over opposed pulleys or sprockets 20 and 22. The sprocket or pulley 22 is mounted on a driven shaft 24 that is driven through a drive transmission by a motor 26. The motor may be electric, hydraulic, or otherwise, and capable of providing output power to the various power driven elements of the apparatus.

The motor 26 includes opposed output shafts 28 and 30. The shaft 28 has a worm 32 driving a worm gear 34. The worm gear 34 drives a shaft 36 having a worm 38 driving a worm gear 40. Worm gear 40 is integrally attached to drive shaft 24, such shaft also having gear 42 and pulley or sprocket 22 which drives the belt or chain 18.

The belt or chain 18 includes a cog or lug 44 that engages parallel ribs 46 extending from the bottom of the table 10. The ribs include three parallel ribs that are offset from one another such that the cog moves around the center rib as the belt is driven to drive the table between the loading/unloading, resurfacing and buffing stations or positions and causes dwell time at the resurfacing and buffing stations. FIGS. 4, 5 and 6 show the table in the loading/unloading position so that an optical disc may be loaded or unloaded onto the turntable, while FIGS. 7 to 9 show the table in the resurfacing position where the disc goes through a resurfacing operation. Finally, FIGS. 1 to 3 show the disc support table in the buffing position where the optical disc undergoes a buffing operation.

The shaft 36 includes the resurfacing wheel and rotates the resurfacing wheel 48 in a counter-clockwise direction as viewed in FIG. 1. Thus, the motor 26 through the system of gears and shafts drives the resurfacing wheel 48. The resurfacing wheel shown will be like that disclosed in U.S. Pat. No. 5,964,650, commonly assigned to the assignee herein and incorporated by reference in its entirety, although it should be appreciated that any other type of resurfacing wheel may be used. For example, the resurfacing wheel may be in the form of a buffing wheel with multiple layers of fabric of an aggressive material that could remove scratches and blemishes.

The shaft 30 driven by the motor 26 drives a worm 50 that in turn drives a worm gear 52 mounted on the buffing wheel shaft 54. The buffing wheel 56 is carried on the shaft 54 in a suitable manner. While any suitable type of buffing wheel may be used, it will be appreciated that it would generally include multiple layers of a suitable fabric. Further, at least one layer could be of conductive cloth, while other layers could be of anti-static cloth.

It will be understood as the timing chain or belt with the cog is continuously driven the cog engages the ribs 46 to cause movement of the table for the optical disc between the loading/unloading station, the resurfacing station and the buffing station. While in the resurfacing station, the timing chain 18 will allow the table to dwell in that position during the resurfacing operation, and similarly in the buffing station the timing chain will allow the table to dwell during the buffing operation.

The dwell times at the resurfacing and buffing stations are substantially the same and in accord with the speed of the timing chain. Also, at the resurfacing station during resurfacing of the optical disc on the table, a ring gear 58 on the platen will be engaged by a gear 42 driven by the shaft 36. However, when the optical disc table is at the buffing station, the action of the buffing wheel automatically drives and rotates the optical disc on the platen in the direction shown by the arrow.

It will be appreciated that at the resurfacing position a suitable resurfacing fluid is sprayed onto the optical disc prior to and during resurfacing of the optical disc. Any resurfacing fluid that is still on the optical disc is quickly removed through a combination of the high rotational speed of the buffing wheel and evaporation. Thus, when the buffing operation is completed the optical disc is free from any resurfacing fluid. Following the buffing operation, the sliding optical disc table is driven back to the position where the optical disc may be removed, and at that position the drive stops such as by an automatic switch. Thus, the optical disc is then completely resurfaced and buffed and ready for future use.

Alternatively, a water pump may be driven by the shaft 37 on which the worm gear 40 is mounted. The water pump is provided for spraying water onto the optical disc at the resurfacing station and would automatically spray water onto the optical disc, thereby eliminating the need to manually spray water or resurfacing fluid on the disc. A suitable cam may be provided that would actuate the water pump elevating the shaft 37 to engage a ratchet drive on the pump (not shown) for driving the pump to distribute water onto an optical disc only during the resurfacing operation.

It will be noted particularly in FIGS. 3, 6 and 9 that the table 10 is slotted at 60 to allow the table to move into the resurfacing position as the vertical shaft 24 extends above and below the table. The gear 42 would engage the ring gear 58 at the resurfacing station to drive the platen 12 on which the optical disc would be placed.

Accordingly, a single motor 26 is provided to not only drive the resurfacing and buffing wheels but also the timing chain or belt which drives the optical disc supporting table between the various stations. The optical disc is turned at about 3 revolutions per minute of the resurfacing wheel to facilitate the resurfacing operation.

From the foregoing, it will be appreciated that the apparatus, once a cycle is started, will automatically resurface and then buff an optical disc to remove any scratches and/or blemishes that would interfere with the operation of the optical disc. The apparatus can be programmed so that once a start button is depressed, the resurfacing and buffing operations are automatically produced and that optical disc is brought back to the loading and unloading position.

It will be understood that modifications and variations may be effected without departing from the scope of the novel concepts of the present invention, but it is understood that this application is to be limited only by the scope of the appended claims.

What is claimed is:

1. An apparatus for resurfacing and buffing an optical disc, the apparatus comprising:
   means for supporting an optical disc for rotational and slidable movement;
   a resurfacing wheel;
   a buffing wheel; and
   means for driving the supporting means and the resurfacing wheel to first cause said supporting means to align an optical disc with the resurfacing wheel for resurfacing the optical disc and to next cause said supporting means to align the optical disc with the buffing wheel for buffing the optical disc.

2. The apparatus of claim 1, which further comprises means for wetting the optical disc during resurfacing.

3. An apparatus for resurfacing and buffing a circular optical disc, the apparatus comprising:
- means for rotatably supporting an optical disc;
- means for slidably mounting said rotatably supporting means for movement between resurfacing and buffing stations;
- a rotatable resurfacing wheel at said resurfacing station; and
- means for driving said supporting means between said resurfacing and buffing stations, and for driving said resurfacing wheel and said rotatably supporting means at said resurfacing station.

4. The apparatus of claim 3, which further comprises means at the resurfacing station for automatically wetting said optical disc during resurfacing.

5. The apparatus of claim 3, wherein said driving means includes means for timing a dwell at the resurfacing and buffing stations.

6. An apparatus for resurfacing and buffing a circular optical disc, the apparatus comprising:
- means for rotatably supporting an optical disc;
- means for slidably mounting said rotatably supporting means for movement between loading/unloading, resurfacing and buffing stations;
- a rotatable resurfacing wheel at said resurfacing station;
- a rotatable buffing wheel at said buffing station; and
- means for driving said supporting means between said loading/unloading, resurfacing and buffing stations, and for driving said resurfacing wheel and said rotatably supporting means at said resurfacing station.

7. The apparatus of claim 6 wherein the means for rotatably supporting an optical disc includes a rotatable platen on which a disc may be received, and the driving means includes a motor and timing chain.

* * * * *